Feb. 4, 1936.  M. H. KUHNER  2,029,725

METHOD AND APPARATUS FOR BURNING SEWAGE SLUDGE

Filed March 24, 1933

INVENTOR
MAX H. KUHNER
BY
Albert G. Blodgett
ATTORNEY

Patented Feb. 4, 1936

2,029,725

UNITED STATES PATENT OFFICE 2,029,725

METHOD AND APPARATUS FOR BURNING SEWAGE SLUDGE

Max H. Kuhner, Worcester, Mass., assignor to Riley Stoker Corporation, Worcester, Mass., a corporation of Massachusetts Application March 24, 1933, Serial No. 662,570

9 Claims. (Cl. 110—8)

This invention relates to a method and apparatus for burning sewage sludge whereby substantially complete combustion of the sludge may be obtained.

The matter of sewage disposal presents a very serious problem today because of the increased density of population and the grave dangers to the public health resulting from pollution of rivers and streams. Many cities have been forced to construct large and costly sewage treating plants. Not only are these plants very expensive to operate, but there is moreover no financial return from their operation.

Sewage sludge contains a considerable amount of combustible matter, and by burning the sludge it is possible to liberate heat which can be used for the generation of steam and the production of electric power. While prior attempts have been made to burn this material, they have proven impractical and unsuccessful in actual operation.

It is accordingly one object of the invention to overcome these difficulties and to provide a simple and inexpensive method and apparatus for burning sewage sludge.

It is a further object of the invention to provide a method of burning sewage sludge which can be carried on successfully in actual practice by comparatively unskilled operators.

It is a further object of the invention to provide an apparatus for burning sewage sludge which will be simple and inexpensive to manufacture, and thoroughly reliable and efficient in operation.

With these and other objects in view, as will be apparent to those skilled in the art, my invention resides in the steps of the process and the combination of parts set forth in the specification and covered by the claims appended hereto.

In accordance with my invention, I break the sludge up into very small particles and spray these particles into a furnace, where they burn in suspension. The air necessary for combustion is preferably preheated and introduced into the furnace with the sludge particles. In case the moisture content of the sludge is very high as compared with the heating value of the combustible matter, I prefer to provide an oil flame near the flame of burning sludge. The preferred apparatus for practicing my improved method comprises a rotatable wheel mounted near an opening in a furnace wall. This wheel is rotated at a very high speed, preferably about a horizontal axis, and the sludge is delivered to the periphery of the wheel and thrown off by centrifugal force through the opening into the furnace. The peripheral portion of the wheel may be formed of closely spaced blades or knives which cooperate with a stationary member to break up the sludge into small particles. An oil burner may be mounted below the wheel to project a flame of burning oil through the opening in the furnace wall.

Referring to the drawing illustrating one embodiment of the invention, and in which like reference numerals indicate like parts, Fig. 1 is a vertical section through a sludge burner and a portion of the adjacent furnace wall, the section being taken on the line 1—1 of Fig. 2;

The embodiment illustrated comprises a vertical furnace wall 10 of refractory material having an opening 11 therein which preferably flares slightly towards the furnace. A wheel 12 is mounted in front of the opening 11, the axis of the wheel being horizontal and parallel to the wall 10, and the bottom of the wheel being slightly below the upper margin of the opening.

Figure 1:
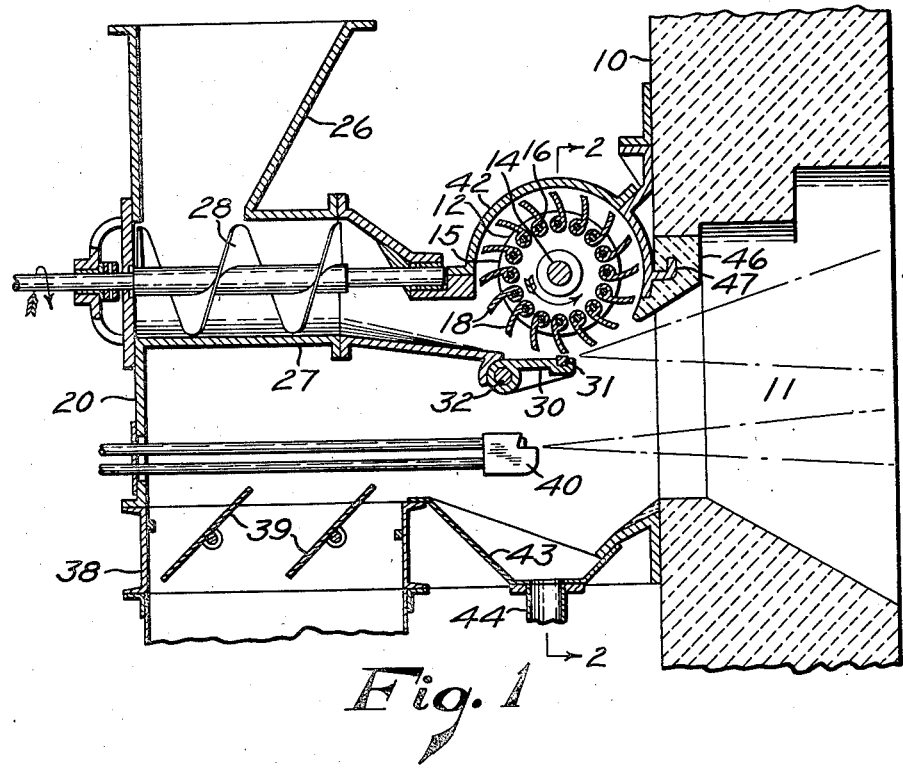
Figures 2, 3, 4:
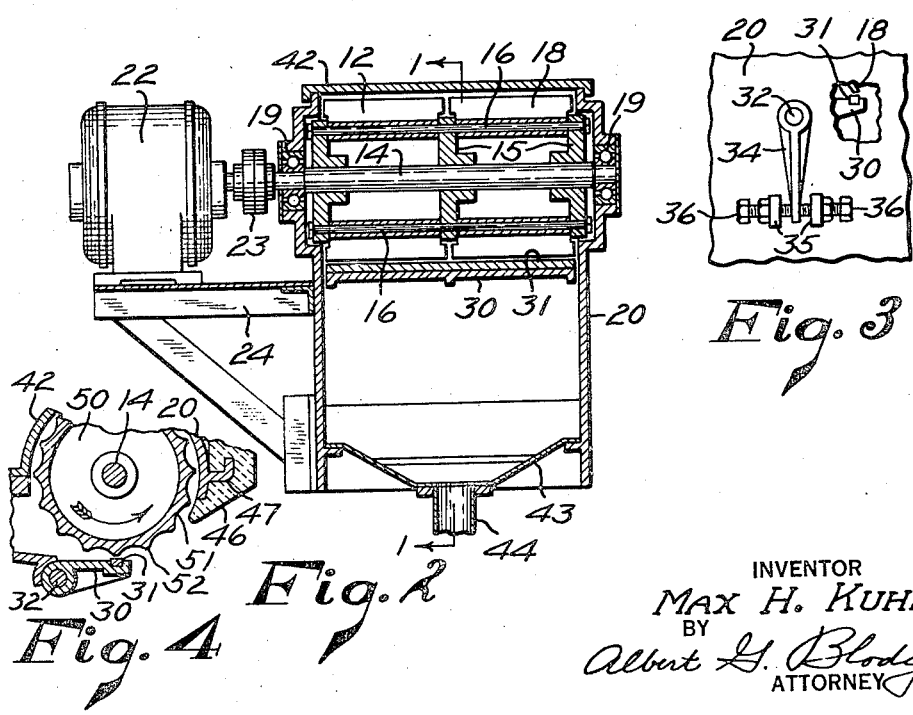
Fig. 2 is a section on the line 2—2 of Fig. 1.
Fig. 3 is a side elevation of a portion of the burner, partially broken away, showing the means for adjusting the stationary plate.
Fig. 4 is a fragmentary view similar to Fig. 1, but showing a modified form of wheel.

This wheel may be constructed in various ways, but in the form illustrated in Figs. 1 to 3 I have provided a central shaft 14 on which are fixed three spaced disks 15. A number of rods 16 extend through the outer portions of the disks in directions parallel to the shaft, and these rods serve as pivotal supports for a series of knives or blades 18 which form the periphery of the wheel. The blades 18 are closely spaced about the circumference of the wheel, as shown in Fig. 1.

The shaft 14 is supported in suitable bearings 19 in a casing 20, and means is provided to rotate the shaft at a high speed in the direction indicated by the arrow in Fig. 1, so that the lower portion of the wheel will travel toward the furnace. The actual speed necessary for the best results will depend upon a number of factors, including the diameter of the wheel 12. With a wheel diameter of 15 inches, I propose to rotate the wheel at approximately 3600 revolutions per minute. In order to drive the wheel, I have shown an electric motor 22 directly connected to the shaft 14 by means of a coupling 23, and supported on a bracket 24 secured to the casing 20.

A hopper 26 is mounted in front of the wheel 12, and a horizontal conduit 27 leads from the bottom of the hopper to the lower front portion of the wheel periphery. A screw-conveyor 28 is mounted in the conduit 27 to carry the sludge from the hopper to the wheel, and this conveyor is rotated comparatively slowly by any suitable source of power (not shown).

At the lower rear margin of the conduit 27 I provide a stationary plate 30 which cooperates with the wheel 12 to produce a shearing action on the sludge, whereby the sludge is broken up into very small particles. This plate is positioned close to and beneath the wheel. In the preferred construction the plate 30 is provided on its upper surface with a renewable blade 31 which nearly touches the revolving knives 18. In order that the clearance between the knives 18 and the blade 31 may be adjusted, I prefer to mount the plate 30 on a horizontal shaft 32 which is rotatably supported by the casing 20. An arm 34 is secured to one end of the shaft 32, as shown in Fig. 3, and this arm is located between two spaced lugs 35 on the casing 20. Adjusting screws 36 are threaded through the lugs 35 and contact with the arm 34, thus holding the plate 30 firmly in a position which may be varied as desired.

The air necessary for combustion is preferably introduced into the furnace with the fuel through the opening 11, and for this purpose I have shown an air duct 38 connected to the casing 20 below the conduit 27. Dampers 39 are provided in this duct to control the rate of air flow. The air will travel horizontally and pass through the opening 11 beneath the stream of sludge.

In the drawing I have shown an oil burner 40 which is located directly beneath the plate 30 and arranged to project an oil flame through the opening 11. This burner 40 is preferably of the well-known steam atomizing type and is so constructed as to produce a comparatively flat fan shaped flame in a substantially horizontal plane.

In order to facilitate access to the wheel 12, I have provided an arcuate cover plate 42 above the wheel and concentric therewith. When this cover plate is removed, the wheel can be washed by means of a stream of water from a hose. A collecting basin 43 provided with a drain pipe 44 is located at the bottom of the casing 20 and beneath the wheel to receive the water during the washing process.

The wheel 12 is preferably protected from the radiant heat of the combustion flame by means of a horizontal row of refractory blocks 46. These blocks are supported by a ledge 47 projecting rearwardly from the casing 20, and they extend downwardly close to the stream of sludge thrown off by the wheel.

The operation of the invention will now be apparent from the above disclosure. The furnace is first heated to a fairly high temperature by means of the oil burner 40. Air for combustion is supplied through the duct 38, the rate of flow being controlled by the dampers 39. This air is preferably preheated by any suitable apparatus (not shown). The sewage sludge is delivered to the hopper 26 by any suitable conveying system, having first been de-watered by suitable filters or equivalent apparatus. I prefer that the moisture content of the delivered sludge shall be between the limits of 50 and 80 per cent. The wheel 12 is rotated at a high speed by the motor 22, and the sludge is advanced in a compact mass against the periphery of the wheel by means of the rotating screw conveyor 28. The screws 36 are adjusted to bring the blade 31 nearly into contact with the revolving blades 18, and these blades separate very small particles of sludge from the forward portion of the mass and throw the particles into the furnace in the form of a fine spray. The sludge particles are ignited by the heat from the oil flame and the furnace, and they burn in suspension in the furnace chamber. Ordinarily the oil flame can be extinguished after the sludge stream has been ignited, but if the sludge has a comparatively high moisture content and a low heating value it will be necessary to burn oil continuously. However, this heat will not be wasted, for it can be used for the generation of steam and the production of electric energy.

It will be apparent that by using my invention it is possible to construct a sewage disposal plant which will be a source of considerable profit to the community. The apparatus necessary is simple and inexpensive, and the process can be carried on by comparatively unskilled operators.

In Fig. 4 I have illustrated a somewhat modified construction including a wheel 50 shaped as a hollow cylinder. The outer surface of the cylinder is provided with longitudinal flutes or grooves 51 which are separated by closely spaced blades or ribs 52. Except for the construction of the wheel, the parts are the same as in Figs. 1 to 3. The blades 52 revolve close to the stationary plate 30 and the blade 31, and the sludge is broken up into very small particles by the rapidly repeated shearing action.

Having thus described my invention, what I claim as new and desire to secure by Letters Patent is:

1. The method of burning sewage sludge having a high moisture content comprising the steps of breaking up the sludge into very small particles, spraying the particles in a substantially flat horizontal stream into a furnace, providing a flat substantially horizontal flame of burning oil close to and beneath the stream of particles, and burning the particles while in suspension in the furnace.

2. Apparatus for burning sewage sludge comprising a substantially vertical furnace wall having an opening therethrough, a wheel mounted outside the wall and adjacent the opening, the wheel being rotatable about a substantially horizontal axis and having closely spaced blades on its periphery, the axis of the wheel being substantially parallel to the wall, means to rotate the wheel at a high speed in such a direction that the lower portion thereof travels toward the furnace wall, a stationary plate close to and beneath the wheel, said plate being pivotally adjustable about a horizontal axis, means to deliver sewage sludge to the lower front portion of the wheel periphery, the blades cooperating with the stationary plate to break the sludge up into small particles and throw the particles through the opening into the furnace in the form of a spray, and means to introduce air through the opening into the furnace beneath the stream of particles and thus burn the sludge in suspension.

3. Apparatus for burning sewage sludge comprising a substantially vertical furnace wall having an opening therethrough, a wheel mounted outside the wall and adjacent the opening, the wheel being rotatable about a substantially horizontal axis and having closely spaced blades on its periphery, the axis of the wheel being substantially parallel to the wall, means to rotate the wheel at a high speed in such a direction that the lower portion thereof travels toward the furnace wall, a stationary plate close to and beneath the wheel, means to deliver sewage sludge to the lower front portion of the wheel periphery, the blades cooperating with the stationary plate to break the sludge up into small particles and throw the particles through the opening into the furnace in the form of a spray for combustion in suspension, and an oil burner located beneath the stationary plate and arranged to project a flame of burning oil through the opening beneath the spray of burning sludge.

4. The method of burning sewage sludge comprising the steps of advancing the sludge in a compact mass, separating very small particles of sludge from the forward portion of the mass, spraying the particles immediately after their separation into a furnace, and burning the particles while in suspension in the furnace.

5. The method of burning sewage sludge comprising the steps of advancing the sludge in a compact mass, separating very small particles of sludge from the forward portion of the mass, spraying the particles immediately after their separation in a substantially flat horizontal stream into a furnace, and burning the particles while in suspension in the furnace.

6. The method of burning sewage sludge comprising the steps of advancing the sludge in a compact mass, separating very small particles of sludge from the forward portion of the mass, spraying the particles immediately after their separation in a substantially flat horizontal stream into a furnace, introducing air into the furnace directly beneath the stream of particles, and burning the particles while in suspension in the furnace.

7. The method of burning sewage sludge comprising the steps of advancing the sludge in a compact mass, separating very small particles of sludge from the forward portion of the mass, spraying the particles immediately after their separation into a furnace, providing a flame of burning oil close to the stream of particles, and burning the particles while in suspension in the furnace.

8. The method of burning sewage sludge comprising the steps of advancing the sludge in a compact mass, separating very small particles of sludge from the forward portion of the mass, spraying the particles immediately after their separation in a substantially flat horizontal stream into a furnace, providing a flame of burning oil close to and beneath the stream of particles, and burning the particles while in suspension in the furnace.

9. Apparatus for burning sewage sludge comprising a wheel rotatable about a substantially horizontal axis, means to deliver sewage sludge to the periphery of the wheel, a casing enclosing the wheel and shaped to provide a collecting basin beneath the wheel, a drain pipe connected to the collecting basin, and a removable cover plate above the wheel.

MAX H. KUHNER.